(12) United States Patent
McClatchie

(10) Patent No.: US 9,857,663 B1
(45) Date of Patent: Jan. 2, 2018

(54) PHASE DETECTION AUTOFOCUS SYSTEM AND METHOD

(71) Applicant: Google Inc., Mountain View, CA (US)

(72) Inventor: Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 683 days.

(21) Appl. No.: 13/961,382

(22) Filed: Aug. 7, 2013

Related U.S. Application Data

(60) Provisional application No. 61/680,459, filed on Aug. 7, 2012.

(51) Int. Cl.
*H04N 9/07* (2006.01)
*G03B 13/00* (2006.01)
*G03B 13/36* (2006.01)
*H04N 5/225* (2006.01)

(52) U.S. Cl.
CPC .................................. *G03B 13/36* (2013.01)

(58) Field of Classification Search
CPC .. H04N 5/2254; H04N 9/045; H04N 5/23212; H04N 13/0431; H04N 13/0242; H04N 13/0239; H04N 13/0217; G02B 17/0856; G02B 27/288; G02B 27/46; G02B 5/3083; G02B 21/0064; G02B 5/20; G02B 5/22; G02B 5/28; G03B 13/36; G03B 27/547; G03B 11/00; G03B 17/14; G03B 35/08; G03B 3/10
See application file for complete search history.

(56) References Cited

U.S. PATENT DOCUMENTS

| | | | |
|---|---|---|---|
| 2003/0202238 A1* | 10/2003 | Tsurumune | G02B 21/16 359/361 |
| 2006/0262659 A1* | 11/2006 | Kurosawa | G02B 7/08 369/1 |
| 2007/0258006 A1* | 11/2007 | Olsen | G02B 7/021 348/345 |
| 2008/0239091 A1* | 10/2008 | Soga | 348/222.1 |
| 2011/0090379 A1* | 4/2011 | Koizumi | H04N 9/045 348/242 |

\* cited by examiner

*Primary Examiner* — Twyler Haskins
*Assistant Examiner* — Carramah J Quiett
(74) *Attorney, Agent, or Firm* — Dority & Manning, PA

(57) ABSTRACT

An optical system is provided that uses unwanted light to perform autofocus functions. More particularly, one or more optical elements may be used to reflect unwanted light to one or more secondary image sensors associated with an autofocus function. Such unwanted light may include, for example, IR, UV, or visible light not necessary for creating a resulting image detected by a primary sensor.

18 Claims, 8 Drawing Sheets

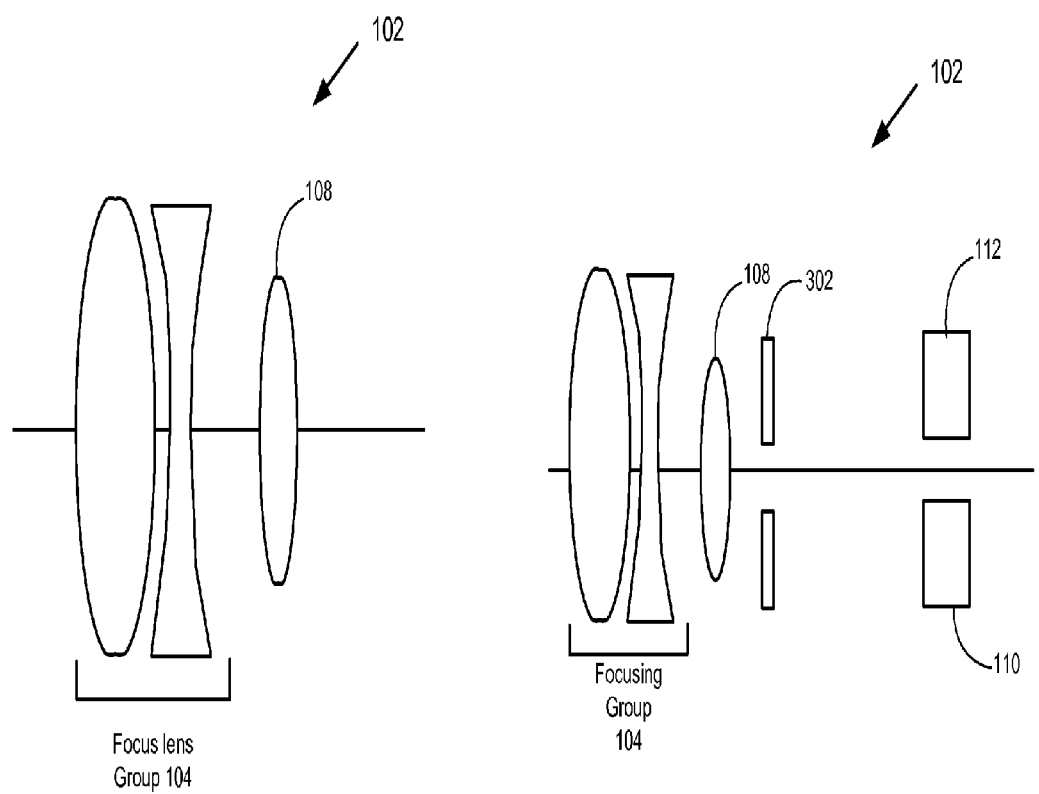

PHASE DETECTION AUTOFOCUS SYSTEM AND METHOD

CROSS-REFERENCE TO RELATED APPLICATION

The present application is based on and claims priority to U.S. Provisional Application 61/680,459 having a filing date of Aug. 7, 2012, which is incorporated by reference herein.

TECHNICAL FIELD

Aspects of examples disclosed herein relate to systems and methods for performing autofocus functions within optical systems.

BACKGROUND

A typical passive autofocus optical lens system includes an optical system, one or more image sensors, a controller and a motor to automatically focus the optical lens on a selected object. There are various methods of providing autofocus including active and passive autofocus systems and methods. Active autofocus systems measure distance to the subject independently of the optical system, and subsequently adjust the optical lens system to provide correct focus. These measurements can be made with displacement sensors which can be ultrasonic, laser or infrared. Passive methods determine correct focus by performing passive analysis of the image entering the optical system. Passive autofocus can be achieved by systems and methods of phase detection and contrast detection autofocus. Camera manufacturers typically have to choose between phase detection and contrast detection in designing camera autofocus optical systems.

SUMMARY

It is appreciated that there is a need for systems and methods of autofocus systems to overcome the limitations of typical phase detection and contrast detection systems to provide higher quality images and improved autofocus performance. In particular, it is appreciated that a typical phase detection autofocus function only uses a small portion of light and results in an autofocus image that is noisier (due to reduced light amount) and blurrier due to diffraction limit. Typical contrast detection autofocus systems need a reference image to compare metrics to determine whether the camera is in focus, and also result in "hunt", which creates delay in taking images.

According to one aspect, it is appreciated that much of the light that is reflected off a subject that a person wishes to photograph or take video of is unused by digital cameras. Most digital cameras employ infrared (IR) and ultraviolet (UV) filters to reflect away unwanted light within the spectrum, as this light would otherwise defocus and/or ruin the color of a resulting image. To this end, it is appreciated that an optical system may be employed that uses this unwanted light to perform autofocus functions. More particularly, rather than reflecting these types of unwanted light out the front of the lens, one or more optical elements may be used to reflect this unwanted light to one or more secondary image sensors associated with an autofocus function.

In one embodiment, IR light may be reflected and used to perform an autofocus function. Standard CMOS sensors are quite sensitive to a wide band of IR light in a range of 650 nm to 1000 nm, and so it is realized that IR light substantially within this range may be used to determine focus. However, it is also appreciated that most lenses focus IR light farther back than visible light, an optical system may be provided that corrects for this difference. Also, it is appreciated that for most lenses, the difference in focus between IR light and visible light is much less than UV light and visible light. One advantage of using IR light is that there is a large amount of light present within detectable ranges that may be used—for a grey target between 670 and 860 nm (near infrared), a typical CMOS sensor may collect 68% more photoelectrons than between 580 nm and 670 nm (red). To this end, IR light received from an incoming light source may be directed to an autofocus sensor that performs an autofocus function.

In another embodiment, UV light may be used to perform an autofocus function. For instance, it is possible to use a relatively low band of unwanted UV light that standard CMOS sensors are sensitive to, typically in the range of 375 nm and 405 nm. Similar to a system that uses IR light for autofocus, an optical system may be provided that directs UV light to an autofocus sensor that performs an autofocus function. In one such embodiment, UV light substantially within a range of 375 nm and 405 nm may be used.

In yet another embodiment, it is appreciated that a portion of the visible light spectrum may be used to perform an autofocus function. For instance, light within the visible band that is not needed to form an image on the primary sensor may be used for the purpose of performing autofocus. Because light from the visible band may be used, the focus distance of the light used for autofocus is similar to the focus distance of the image, and therefore, corrections such as calculating offsets, focal lengths, and/or special lenses may not be necessary. In one implementation, small bands of visible light may be reflected to an autofocus sensor. In one example, yellow and cyan within the visible spectrum (e.g., light bands centered at approximately 585 nm and 500 nm, respectively), may be used for performing autofocus functions. With these particular bands, it is appreciated that there may be an excess of light within particular bands, and therefore, some of this light may be redirected to autofocus functions without adversely affecting quality of the resulting image.

Aspects and embodiments describe herein are directed to an image device having an optical lens system, a main image sensor and an autofocus system. The image device is configured to split or filter most of the visible light to the main image sensor and the unwanted light to the autofocus system. Unwanted light may include, for example, light not within usable bands for creating a resulting image or excess light within usable bands that, if diverted for performing autofocus functions, does not adversely affect image quality. In one embodiment, the autofocus system uses a phase detection sensor. In one implementation, the phase detection sensor uses the invisible or unusable light to generate multiple focusing images. The focus detection system can detect a defocus amount of the optical lens system based on the images generated by the phase detection sensor.

According to one aspect, an image device is provided comprising an optical lens system configured to receive light from a object, a beam splitter configured to receive light from the optical lens system and reflect light having a first spectrum and a second spectrum, wherein the second spectrum light includes light not needed to determine output image data corresponding to an image of the object, an autofocus system configured to receive the second spectrum light from the beam splitter and determine a defocus amount of the optical lens system using the second spectrum light, and a main image sensor configured to receive the first spectrum light from the beam splitter and configured to output the object image data corresponding to the image of the object.

According to one embodiment, the autofocus system further comprises at least one secondary sensor configured to receive the second spectrum light from the beam splitter and produce at least two images. According to another embodiment, the autofocus system further comprises a focus detector configured to detect a defocus amount of the optical lens system based on the at least two images. According to another embodiment, the first spectrum light includes visible light and the second spectrum light includes at least one of infrared light and ultraviolet light.

According to another embodiment, the infrared light reflected by the beam splitter includes a range of wavelengths approximately between 670 nm and 860 nm. According to yet another embodiment, the ultraviolet light reflected by the beam splitter includes a range of wavelengths approximately between 375 nm and 405 nm. According to another embodiment, the visible light reflected by the beam splitter includes a range of wavelengths the approximately between 375 nm and 670 nm.

According to another embodiment, the optical lens system includes at least one corrective lens configured to focus the infrared light at a first distance and the visible light at a second distance, and wherein the first distance is substantially equal to the second distance. According to another embodiment, the autofocus system is configured to drive the optical lens to focus on the object based on the defocus amount. According to another embodiment, the image device further comprises a filter positioned between the optical lens system and the main image sensor and configured to filter a portion of the second spectrum light before the portion of the second spectrum light reaches the main image sensor.

According to another embodiment, the optical lens system further includes an aperture stop and wherein the beam splitter is positioned in front of the aperture stop. According to another embodiment, the optical lens system further includes an aperture stop and wherein the beam splitter is positioned after the aperture stop. According to another embodiment, the optical lens system further includes an iris diaphragm and wherein the iris diaphragm is configured as a filter that transmits infrared light. According to another embodiment, at least one face of the beam splitter is triangular. According to another embodiment, the optical lens system further includes at least one corrective optic lens.

According to another embodiment, an image device is provided comprising an optical lens system configured to receive light from a object, at least one dichroic filter configured to receive light from the optical lens system and separate light into a first spectrum light and a second spectrum light, wherein the second spectrum light includes narrow bands of visible light, an autofocus system configured to receive the second spectrum light from the at least one dichroic filter and determine a defocus amount of the optical lens system based on the second spectrum light, and a main image sensor configured to receive the first spectrum light from the at least one dichroic filter and configured to output object image data corresponding to an image of the object.

According to one embodiment, the second spectrum light includes narrow bands of visible light in overlapping regions of a color filter array used in the main image sensor. According to another embodiment, the narrow bands of visible light comprise at least one narrow band of light including at least one band from a group comprising yellow light and cyan light. According to another embodiment, the overlapping regions include light within at least one range from a group comprising light in a range substantially between 490 nm and 510 nm and light in a range substantially between 575 nm and 595 nm.

According to another aspect, a method is provided for autofocusing an image device on an object, the image device including an optical lens system, an autofocus system an image sensor. The method comprises acts of receiving, by the optical lens system, light from the object, separating the light into a first spectrum light and a second spectrum light, reflecting the second spectrum light to the autofocus system and reflecting the first spectrum light to the image sensor. The method further comprises acts of detecting a focus state of the optical lens system by using the second spectrum light and producing object image data corresponding to an image of the object by using the first spectrum light.

Still other aspects, embodiments, and advantages of these exemplary aspects and embodiments, are discussed in detail below. Any embodiment disclosed herein may be combined with any other embodiment in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 3A is a schematic diagram of one example of an optical system included in an image device, according to one embodiment;

FIG. 3B is a schematic diagram of one example of an optical system included in an image device, according to one embodiment;

DETAILED DESCRIPTION

Figure 1:
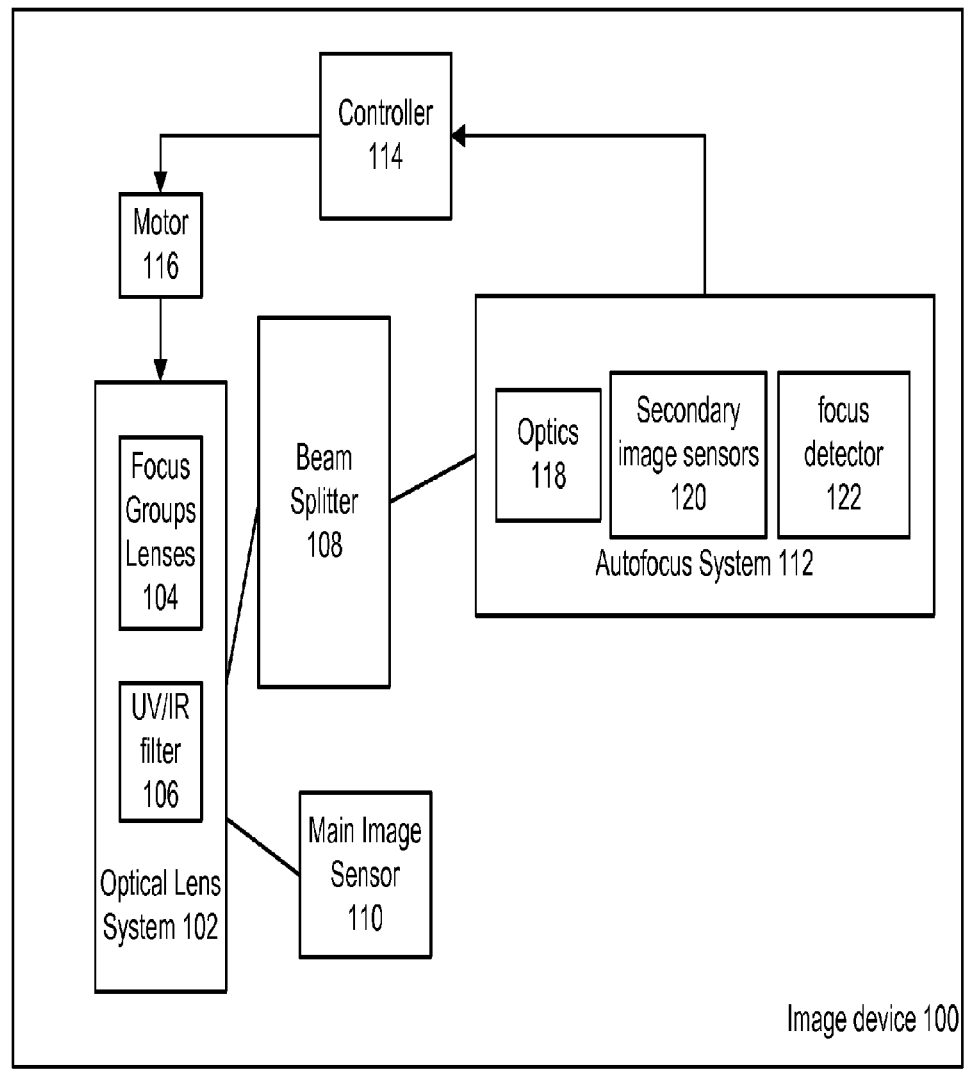
FIG. 1 is a schematic diagram of one example of an image device including a beam splitter, according to one embodiment.

Phase detection autofocus methods employed in typical digital single-lens reflex (DSLR) cameras use the incoming light to produce pairs of images. The images are compared to determine the amount of defocus. Phase detection autofocus systems generally use a mirror to direct a portion of the incoming light to a main image sensor and another portion of the incoming light onto an autofocus sensor. Such autofocus systems generally include one or more image sensors and use the portion of the light to produce two images compare the two images to measure the amount of defocus. If the lens is in focus, the two images are be identical and placed on top of each other. If the lens is out of focus, the light forms images with a separation distance between them. The separation of the images can be used to determine the amount the lens is out of focus or the defocus amount. The defocus amount determines the distance and direction a motor moves the optical lens to bring the image into focus.

A drawback of a typical phase detection autofocus method is that both the autofocus sensor and the image sensor receive less than the full amount of light. Diminished light delivered to the image sensor results in a noisier and a moderately grainier image, resulting in an image with a lower signal-to-noise ratio. In addition, the image is blurrier due to the diffraction limit of the aperture.

Further, when used indoors or in other conditions of low light levels, the available ambient light may not be sufficient for a camera to autofocus and thus requires supplemental light to operate correctly. For DSLRs, additional light can be supplied by a flash. Easily portable flash units are often good for a few hundred images taken with the DSLR. For video work, a few hundred images correspond to around a minute of video, making supplemental light a much less practical solution. In addition, portable supplemental light units cast harsh direct light, while softer bounce supplemental light units require very large battery packs or wall power.

Compared to phase detection autofocus systems, contrast detection autofocus systems are less dependent on the light levels. Instead, the performance of a contrast detection autofocus system is largely dependent on the accuracy and reliability of an image's contrast measurement. Contrast measurement is achieved by measuring contrast within a sensor field, typically measured through the lens. The intensity difference between adjacent pixels of the sensor naturally increases with correct image focus. The control system directs a motor to move the focus of the lens until the maximum contrast is detected. Unlike phase detection autofocus systems, contrast detection autofocus systems do not need a separate image sensor and can potentially be more flexible and more accurate.

However, there are several drawbacks to using contrast detection autofocus method. First, the contract detection autofocus may create distracting artifacts in video sequences. The contrast detection autofocus method requires multiple images and measurements. By comparing measurements from two different images, in very similar conditions but with the lens in a different focus position, that the control system can determine which image is in better focus and thus in which direction to focus the image. If the two images have the same measurements, the control system does not know which direction to focus the image forcing the control system to "guess." The control system can sometimes make the wrong decision forcing the servo motor to "hunt" (or move to one direction and then return), both when far out of focus, and also when in focus. This hunting creates the distracting artifact in video sequences and also introduces delay in the focus process.

Another drawback of contrast detection is the lower focusing speed in comparison with the phase detection method. The measure contrast within the sensor field does not actually provide the distance the motor needs to move to focus the lens. As a result, the autofocus system takes additional measurements as the system brings the lens into focus, thus increasing the time it takes to focus. Because the phase detection system makes a direct measurement of how far out of focus the lens is, the control system can make many fewer measurements to achieve the same focus accuracy, thus decreasing the time it takes to focus.

As discussed above, conventional methods of phase detection autofocus result in grainy and blurry images, specifically in low light video imaging applications. Accordingly, there is a need for a system and method of phase detection autofocus that can use a greater portion of received light resulting in improved image quality. Aspects and embodiments are directed to a system and method of phase detection autofocus that overcomes the limitations of conventional methods, while providing a solution that is able to provide high quality video images in low light situations without the use of an additional light source (e.g., a flash).

According to some examples, an image device is provided that includes an optical lens system, a optical mechanism to separate incoming light into light of a first spectrum and light of a second spectrum, an autofocus system is configured to receive the second spectrum light produce two images, the autofocus system is configured to detect a defocus amount of the optical lens system based on the two images, and a main image sensor configured to receive the first spectrum light and configured to output object image data corresponding to an image of the target object.

Because the autofocus system process can be used with light of any spectrum, it may be desirable to use spectrum of light that is either unusable or unwanted by the main image sensor. As discussed further below, the autofocus system uses the second spectrum of light to determine the amount of defocus of the optical lens system and automatically focuses the optical system. Therefore, in one embodiment, the optical mechanism includes a beam splitter that reflects light of the ultraviolet (UV) or infrared (IR) spectrum to be used by the autofocus system. In another embodiment, the optical mechanism includes a dichroic filter that reflects light nearing the yellow and cyan wavelengths. By using the light that is typically filtered by the image device for focusing the optical system, a larger portion of the visible spectrum of light can be used for forming the image of the object. Further, the second spectrum of light used by the autofocus system does not degrade image quality of the captured image. Using the larger portion of the visible spectrum leads to better picture quality, for example, reduced graininess and blurriness in images in low light applications.

Referring to FIG. 1, there is illustrated one example of an image device 100 according to one or more aspects of the present invention. The image device 100 may be a digital single-lens reflex (DSLR) camera, a video camera, a mobile device camera or any other image capturing device. In the illustrated example, the image device 100 includes an optical lens system 102 having one or more focus lens groups 104 and a UV/IR filter 106, a beam splitter 108, a main image sensor 110, an autofocus system 112, a controller 114 and a motor 116. The autofocus system 112 may include autofocus optics 118, one or more secondary image sensors 120 and a focus detector 122.

In one embodiment, the optical lens system 102 receives light emanating from a target object to be photographed which passes through the optical lens system 102 and falls upon the beam splitter 108. The optical lens system 102 includes the UV/IR filter 104 that filters and reflects light of a first spectrum and light of a second spectrum. The beam splitter 108 reflects the first spectrum onto the main image sensor 110 to be used for forming the image of the target object. The beam splitter 108 reflects light of the second spectrum to the autofocus system 112 to perform phase detection auto-focusing.

In at least one embodiment, the first spectrum is within the visible spectrum of light. This is the spectrum that is typically visible to the human eye. It is appreciated that the human eye may process colors residing in approximately the 390-750 nm range. In one embodiment, second spectrum of light is light that is not visible to the human eye, which may be typically filtered and reflected by the image device. In at least one embodiment, the second spectrum may include light in the UV spectrum. In another embodiment, the second spectrum may include light in the IR spectrum.

Because UV and IR light may cause unwanted aberrations in the image produced by the main image sensor, in a typical image device, UV and IR light may be filtered and reflected out of the image device by the UV/IR filter 106. In one embodiment, the beam splitter 108 is configured to reflect UV and IR light typically reflected by the UV/IR filter 106 to the autofocus system 112. The autofocus system 112 uses the UV and IR light to automatically focus the focus lens group 104, as further described below, while the visible light passes undiminished to the main image sensor 110.

Figure 2:
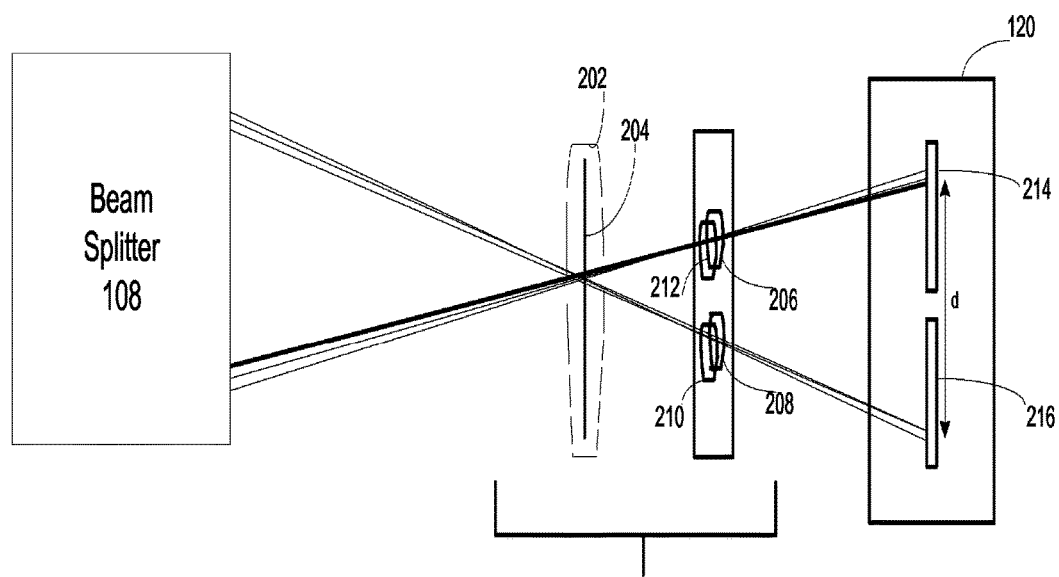
FIG. 2 is a schematic diagram of one example of an autofocus system included in an image device, according to one embodiment.

FIG. 2 shows the autofocus system 112 in further detail. In one embodiment, the autofocus optics 118 of the autofocus system 112 include a condenser lens 202 having an aperture mask 204, a pair of sub-apertures 206 and 208, a pair of re-conversing lenses 210 and 212. In this embodiment, the secondary image sensor 120 includes a pair of light receiving sections 214 and 216. In at least one example, the light from the beam splitter 108 passes to form a primary image in the vicinity of the aperture mask 204. The light is re-converged by the pair of re-converging lenses 210 and 212, via the condenser lens 202 and the pair of sub-apertures 206 and 208, to form a pair of secondary images upon the pair of light receiving sections 214 and 216 of the secondary image sensor 120. The separation distance (d) between the secondary images from the image sensor 120 represents the amount defocus of the optical system 102. Based on the separation distance, the focus detector 122 determines a delta distance, which is the amount that the image plane is shifted from a previously determined focal plane. In one example, +1 mm or −1 mm of defocus is correlated with a particular distance d. While the optical system is "in-focus," the separation distance d may equal to zero and the secondary images may overlap on the secondary image sensor 120.

Referring again to FIG. 1, the focus detector 122 provides the delta distance in the form of a feedback signal to the controller 114. The controller 114 receives the feedback signal and produces a control signal that controls the motor 116. The motor 116 is connected to the focus lens group 104 of the optical lens system 102. The control signal is configured to drive the motor 116 in a rotational direction and by a rotational amount so as to move the focus lens group 104 along an optical axis into a properly focused state.

In one embodiment of the image device 100, the UV/IR filter 104 may be a dichroic coating on one of the lenses within optical system 102. The UV/IR filter 104 may be a reflective cut filter that may transmit light within a pass-band and attenuate light outside of stop bands.

UV/IR filters with different pass-bands and stop-bands may be disposed in different types of cameras. For example, in aerial survey cameras, which may need to photograph through atmosphere, the stop-bands may attenuate light below approximately 420 nm and above 650 nm. For consumer cameras, in one example, the stop band may attenuate light below of approximately 395 nm and above approximately 650 nm. The beam splitter 108 may be configured to accommodate different camera types and UV/IR filters.

While the UV/IR filter 104 may reflect a substantial portion (e.g. >90% transmission of light) of the UV and IR light, the image device 100 may include additional filters which may filter the remaining (e.g. 10%) of unwanted light. In one example, these additional filters may be disposed before the main sensor 110 so that the UV and IR light is filtered before it arrives at the main image sensor 110. The additional filters may include UV and IR cut filters that comprise thin films with varying refractive indices stacked on a transparent surface to achieve a particular wavelength frequency response.

In one embodiment, the beam splitter 108 is located at the back of the optical lens system 102 and receives the light reflected by the UV/IR filter. The beam splitter 108 may be positioned far enough from the focal plane of the optical lens system 102 to eliminate crosstalk between the light rays. In one example, the beam splitter 108 may be configured to reflect UV light ranging between approximately 375 nm and 405 nm. In another example, the beam splitter 108 may reflect near IR light ranging between approximately 670 nm and 860 nm.

FIG. 3A shows one example of the beam splitter 108 disposed within the optical system 102. In one embodiment, the beam splitter 108 is disposed behind or after the focus group of lenses 104. In one embodiment, the focus lens group 104 is designed to pass light through the extra glass of the beam splitter 108. In other embodiment, the optical lens system 102 may include additional groups of lenses. In at least one example, the optical lens system 102 may include a zoom lens group, a compensator group, and a master group. Each of the lens groups may include one or more individual lenses.

The autofocus system 112 may use either IR or UV light for performing phase detection autofocus. However, it is appreciated that in some embodiments, the focus lens group 104 focuses UV light, IR light and visible light at different distances. For example, IR light is focused farther back than visible light and UV light is focused farther back than IR light. This focusing difference can result in visible aberrations in the image formed by the image device 100. In one embodiment, the image device 100 is configured to accommodate the difference in focusing light. In one example, corrective lenses may be included into the optical lens system 102 that can be designed to focus the UV or IR light at the same distance as visible light.

In another example, focus lens group 104 can be designed to focus the UV or IR light at a fixed distance increment over visible light, and the one or more secondary sensors 120 of the autofocus system can be placed at that other distance. The offset between the IR focus plane and the visible light focus plane can be determined by the autofocus system 112 from either the focus lens group design and/or from various calibration measurements. In this example, the secondary image sensors 120 can be shifted to match. The autofocus system 112 can then target a nonzero amount of offset between the phase detection images. In one example, the target offset is a function of the focus distance, as determined by either the lens design or calibration data.

Main image sensor 110 may be a CMOS or a CCD sensor. In one example, CMOS or CCD sensors are sensitive to wavelengths from approximately 380 nm to at least 1000 nm. Main image sensor 110 may capture light through photosensitive diodes, called photosites, each of which may represent a single pixel in the image generated by image device. The more light received by a photosite, the more photons the photosite may record. On the other hand, photosites capturing information from darker objects (e.g., shadows or a dark alley) may record fewer photons. The photons from each photosite may be counted and converted into a digital value, which may represent the color of a single pixel. Each pixel may be filtered to record one of three colors, and various demosaicing algorithms can be used to interpolate to produce a color correction matrix including a set of red, free, blue values for each photosite. The pixel information and interpolated sets of color values may be used to construct an image with color and brightness set by each pixel.

In various embodiments, it is appreciated that to get a large depth of field with a camera it may be necessary to stop down the entrance pupil. Typically in such a system, the beam splitter may be disposed behind or after an aperture stop, which can select two regions of the exit pupil of the optical system. However, stopping down may reduce the stereo separation possible from within the aperture available, thus reducing the focus accuracy. In one embodiment, to increase focus accuracy and stereo separation, the focus lens group 104 is positioned in front of the aperture stop of the entrance pupil. In turn, the beam splitter 108 may be positioned just in front of the aperture stop. FIG. 3B shows one example of a system with an aperture stop 302, where the beam splitter 108 and focus lens group 104 are disposed in front of the aperture stop 302. In this embodiment, the autofocus system 112 can use light from the largest possible entrance pupil, while the main image sensor 110 ca use a smaller pupil with larger depth of field. With this orientation, the autofocus system receives the most stereo separation and thus the best focus accuracy.

Figure 3C:
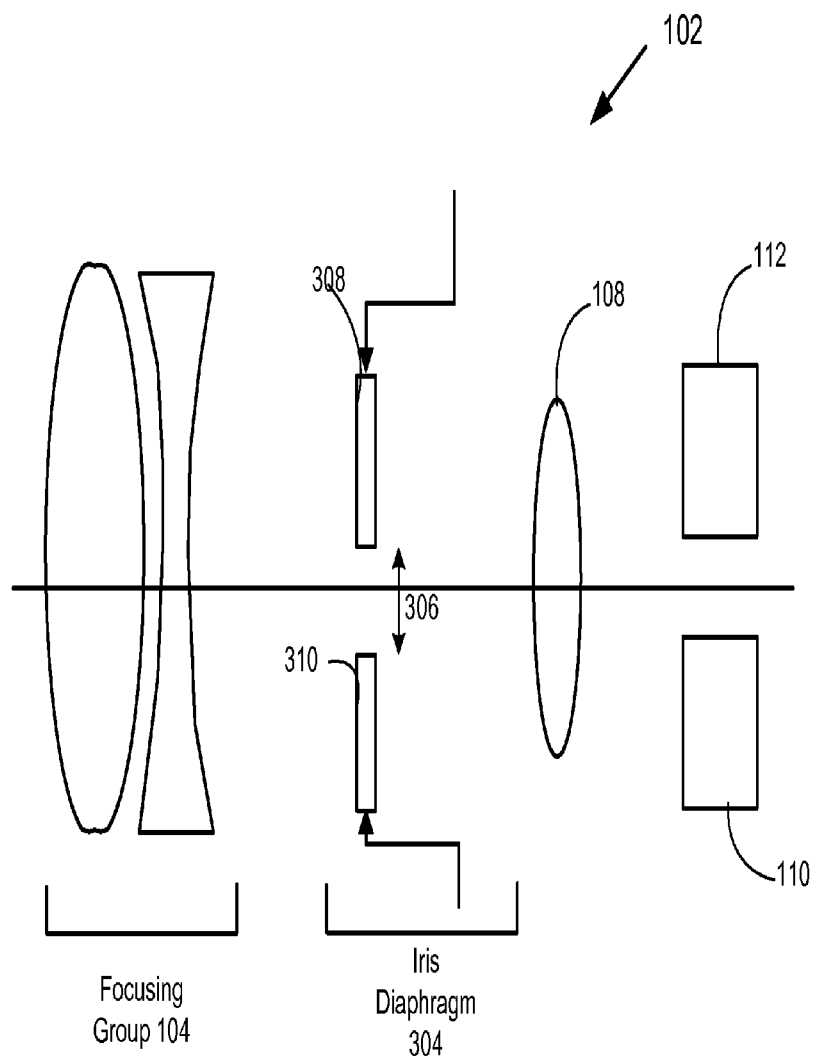
FIG. 3C is a schematic diagram of one example of an optical system included in an image device, according to one embodiment.

FIG. 3C shows another embodiment of the optical system 102. As illustrated in FIG. 3C, to correct for reduced stereo separation, an iris diaphragm 404 (or an aperture adjustment mechanism) is included in the optical system 102. The iris diaphragm 304 may include an aperture stop opening 306 which may be defined by a pair of aperture stop blades 308 and 310. The stop blades 308 and 310 may move inward to or outward from the center of the aperture stop opening 306 to increase or decrease the size of the opening. In one example, the iris diaphragm 304 includes a filter that absorbs or reflects visible light and transmits IR light. In one example, the iris diaphragm 304 with the IR filter allows for adjustment of the aperture for visible light without reducing the aperture for IR light.

Figure 3D:
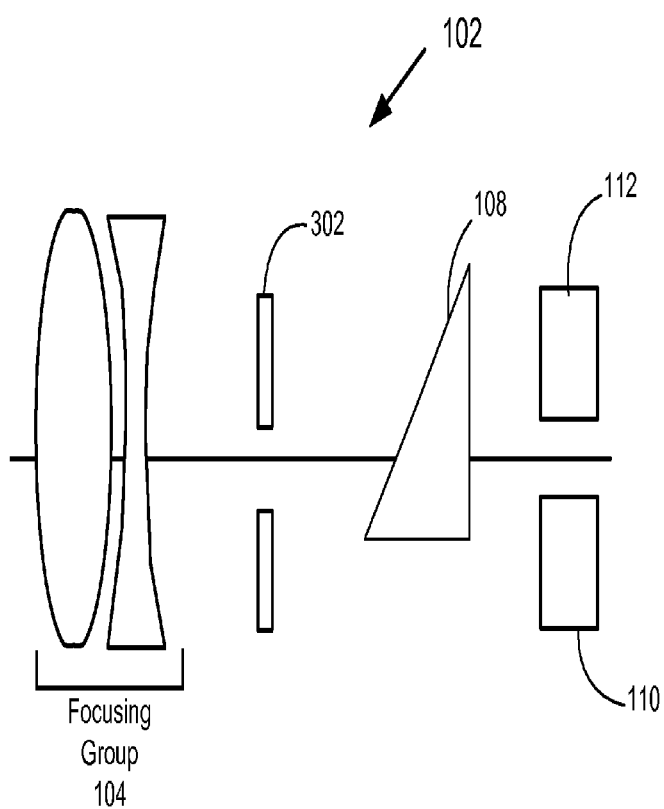
FIG. 3D is a schematic diagram of one example of an optical system included in an image device, according to one embodiment.

FIG. 3D shows another embodiment of the optical system 102. It may be desirable to have the separation of the autofocus images increase as the aperture increases. This can be achieved without additional moving elements, by making the face of the beam splitter triangular. FIG. 3D shows one example of a system with the aperture stop 302, and a triangular beam splitter 108. In one example, the triangular beam splitter 108 can select three regions of the exit pupil. At the smallest apertures, just the tip of the triangle reflects light. At larger apertures, as a larger portion of the triangular beam splitter is exposed, the beam splitter 108 can select four regions of the exit pupil. The center of the reflected beam of light may move farther from the center of the lens, so that the separation between the centers of the reflected beams increases. In one embodiment, beam splitter 108 that can select five or more regions of the exit pupil. However, as the aperture expands, there is a trade off between better separation between the centers of the reflection beams, increased complexity and decreased sensitivity of the system.

Figure 4:
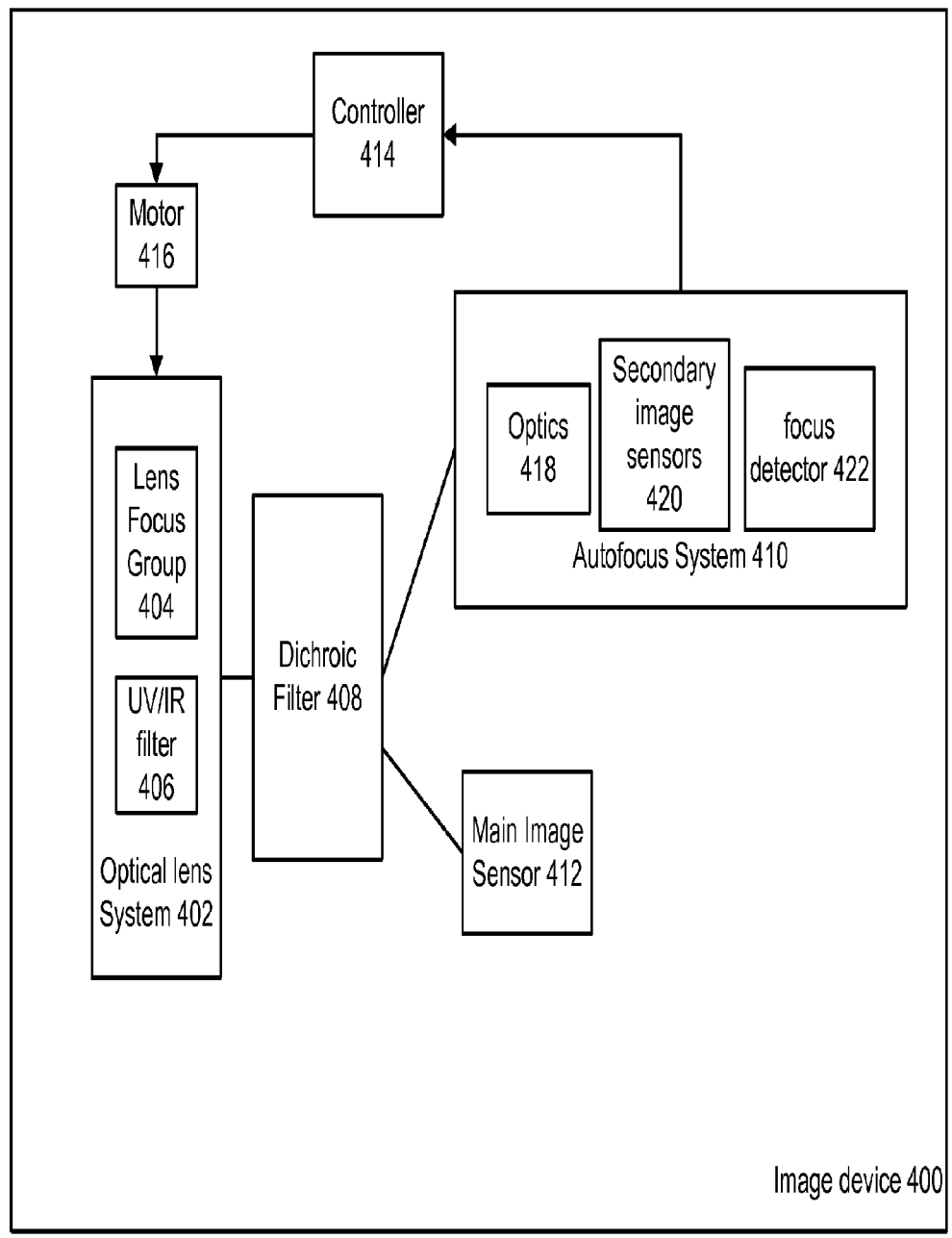
FIG. 4 is a schematic diagram of one example of an image device including a dichroic filter, according to one embodiment.

In another embodiment, the second spectrum of light used by the autofocus system may be particular wavelength of visible light that are unused by the main image sensor. Referring now to FIG. 4, there is illustrated a schematic diagram of one example of an image device 400 according to one or more aspects of the present invention. In one embodiment, the image device 400 includes an optical lens system 402 which includes a focus lens group 404 and a UV/IR filter 406, a dichroic filter 408, an autofocus system 410, a main image sensor 412, a controller 414 and a motor 416. The autofocus system 410 may include optics 418, one or more secondary image sensors 420, and a focus detector 422.

The optical lens system 402 receives light from an object. The UV/IR filter 406 reflects and filters UV/IR light, which is reflected out of the optical lens system 402. The remaining light is passed to the main image sensor 412. In one example, this light includes a second spectrum of visible light which may be subsequently filtered by the main image sensor 412. The dichroic filter 408 may be positioned in the path of incoming light before the light enters the main image sensor 412. The dichroic filter 408 may be configured to filter and reflects light of the second spectrum and allows light of the first spectrum to pass undiminished to the main image sensor 412. The autofocus system 410 uses the light of the second spectrum to determine the amount of defocus of the optical system 402. The amount of defocus is provided to the controller 414 as a feedback signal. The controller 414 based on the feedback signal determines the direction and rotational amount of the motor 416 and moves the focus lens group 404 into focusing position. The light of the first spectrum passes to the main image sensor 412 that uses the light to form an image of the target object.

Figure 5:
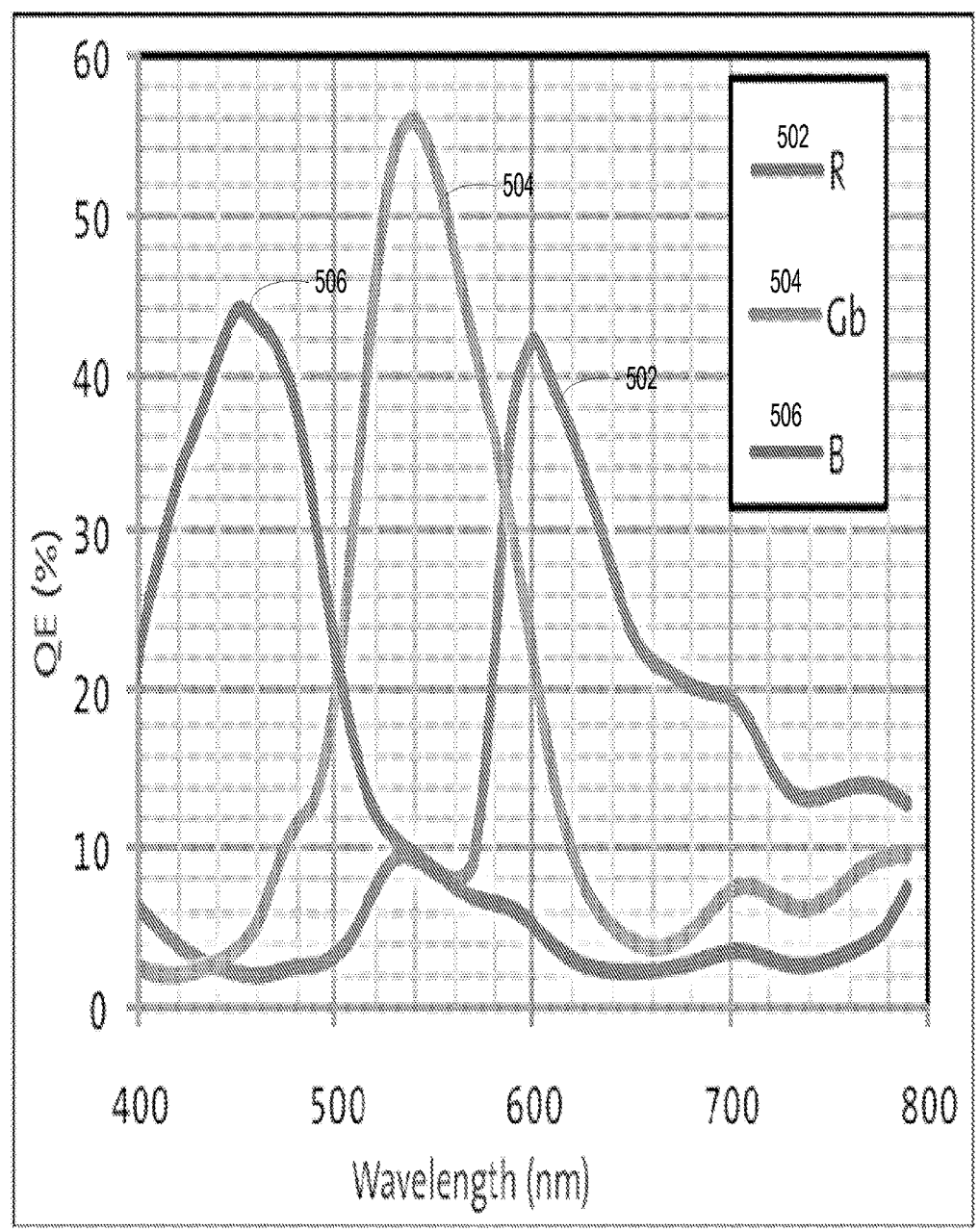
FIG. 5 is a graphical representation of one example of quantum efficiency response of a Bayer filter, according to one embodiment.
Figure 6:
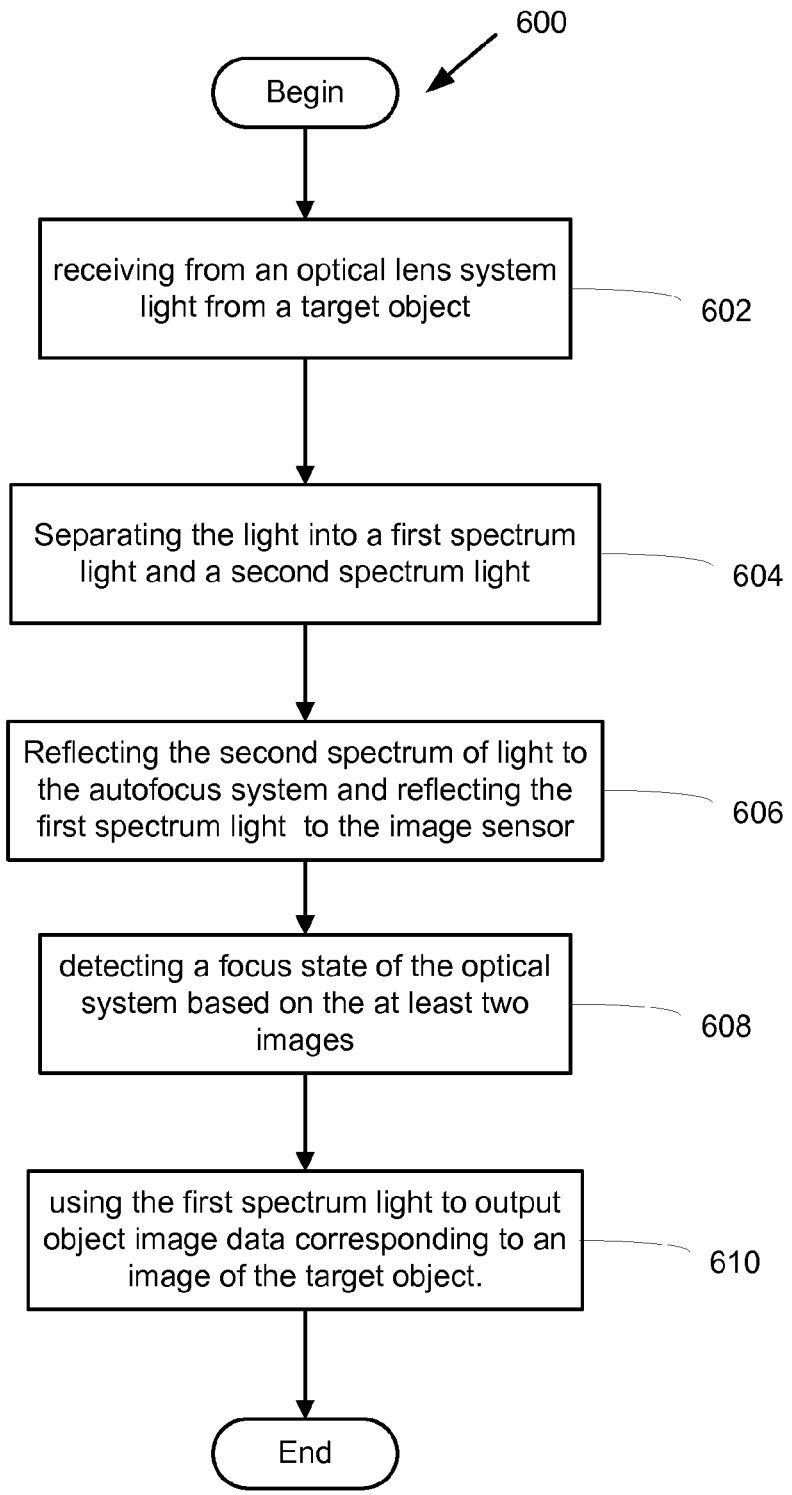
FIG. 6 is a flow diagram of one example of a method of performing autofocusing, according to one embodiment.

Typical image sensors such as the main image sensor 412 may include a Bayer filer. A typical Bayer filter provides is a color filter array (CFA) for arranging RGB color filters on a square grid of photosensors. The filter pattern in the Bayer filter includes 50% green, 25% red and 25% blue. However, such Bayer filters typically may not separate RGB colors that overlap and instead the image sensor may filter them out. FIG. 5 shows a graph of quantum efficiency (QE) versus wavelength for a typical Bayer filter used with a typical image sensor, such as the Aptina MT9F002 sensor. The response shows quantum efficiency for a red filter 502, a green filter 504 and a blue filter 506 included in the color filter array.

As shown in FIG. 5, the red 502 and green filters 504 may include overlapping responses around wavelengths of 490 nm to 510 nm (cyan) and wavelengths of 575 nm to 595 nm (yellow). Such overlapping response may be common to typical Bayer image filters. However, it is appreciated that the response shown in FIG. 5 is presented for purposes of example only and other types of Bayer filters may be used in embodiments of the present invention. It is further appreciated that other Bayer filters may include overlapping response of colors correlated to different ranges of wavelengths.

To provide improved color saturation, the main image sensor removes the overlapping wavelengths with a color correction matrix prior to providing image data to a display. However, by removing these overlapping wavelengths the main image sensor may also amplify noise in the resultant image. In one embodiment, by placing the dichroic filter 408 in front of the main image sensor 412, it is possible to reduce noise in the processed image by reflecting away narrow bands of the overlapping color response.

In one example, the dichroic filter 408 may include pass-bands and stop-bands. The stop-bands of the dichroic filter may attenuate yellow light from 575 nm to 595 nm and cyan light from 490 nm to 510 nm. In one example, the dichroic filter 408 may include one or more dichroic films with sharp transitions between complete reflection and complete transmission. In one example, this yellow and cyan light from the dichroic filter 408 is reflected to the autofocus system 410 to be used for phase detection autofocus.

There may be a few advantages to using the dichroic filter 408. Because the reflected yellow and cyan light is in the visible spectrum, it may have a similar focus distance as the remaining visible band. The autofocus system 410 may not need to provide additional offset management to complete automatic focusing of the optical system 402. In one example, filtering yellow and cyan light may decrease signal-to-noise ratio in the resulting image from the main image sensor. However, because the noise amplification in the color correction matrix is lower, the processed image may result in less noise. Further, the light from the yellow and cyan bands can be combined by the autofocus system 410. The amount of combined light may be a greater amount of light than light in other visible bands. For example, for a grey target can typically have 40% as much light in the yellow and cyan bands combined compared to light in the red band.

A method 600 providing phase detection autofocusing of a target object, according to one example, is now described with reference to FIG. 5. In one embodiment, the method includes receiving by an optical lens system light from a target object (step 602). In step 604, the incoming light from the optical lens system is separated into a first spectrum light and a second spectrum light. In step, 606, the second spectrum of light is reflected to the autofocus system and the first spectrum light is reflected to the image sensor. In step 608, the focus detection system detects a focus state of the optical lens system using the second spectrum light. In step 610, using the first spectrum light, the image sensor produces object image data corresponding to an image of the object.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to horizontal and vertical and upper and lower are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. For instance, such methods may be used within various types of optical systems other than cameras. Further, such methods and systems as described above may be used with contrast detection methods for performing autofocus functions. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An image device comprising:
   an optical lens system configured to receive light from an object;
   a beam splitter configured to receive light from the optical lens system and reflect light having a first spectrum and a second spectrum, wherein the second spectrum light includes light not needed to determine output image data corresponding to an image of the object including at least one of infrared light and ultraviolet light;
   an autofocus system configured to receive the second spectrum light from the beam splitter and determine a defocus amount of the optical lens system using the at least one of infrared light and ultraviolet light of the second spectrum light; and
   a main image sensor configured to receive the first spectrum light from the beam splitter and configured to output the object image data corresponding to the image of the object.

2. The image device of claim 1, wherein the autofocus system further comprises at least one secondary sensor configured to receive the second spectrum light from the beam splitter and produce at least two images.

3. The image device of claim 2, wherein the autofocus system further comprises a focus detector configured to detect a defocus amount of the optical lens system based on the at least two images.

4. The image device of claim 1, wherein the first spectrum light includes visible light.

5. The image device of claim 4, wherein the infrared light reflected by the beam splitter includes a range of wavelengths approximately between 670 nm and 860 nm.

6. The image device of claim 4, wherein the ultraviolet light reflected by the beam splitter includes a range of wavelengths approximately between 375 nm and 405 nm.

7. The image device of claim 4, wherein the visible light reflected by the beam splitter includes a range of wavelengths the approximately between 375 nm and 670 nm.

8. The image device of claim 4, wherein the optical lens system includes at least one corrective lens configured to focus the infrared light at a first distance and the visible light at a second distance, and wherein the first distance is substantially equal to the second distance.

9. The image device of claim 1, wherein the autofocus system is configured to drive the optical lens to focus on the object based on the defocus amount.

10. The image device of claim 1, further including a filter positioned between the optical lens system and the main image sensor and configured to filter a portion of the second spectrum light before the portion of the second spectrum light reaches the main image sensor.

11. The image device of claim 1, wherein the optical lens system further includes an aperture stop and wherein the beam splitter is positioned in front of the aperture stop.

12. The image device of claim 1, wherein the optical lens system further includes an aperture stop and wherein the beam splitter is positioned after the aperture stop.

13. The image device of claim 1, wherein the optical lens system further includes an iris diaphragm and wherein the iris diaphragm is configured as a filter that transmits infrared light.

14. The image device of claim 13, wherein at least one face of the beam splitter is triangular.

15. The image device of claim 1, wherein the optical lens system further includes at least one corrective optic lens.

16. An image device comprising:
   an optical lens system configured to receive light from an object;
   at least one dichroic filter configured to receive light from the optical lens system and separate light into a first spectrum light and a second spectrum light, wherein the second spectrum light includes narrow bands of visible light, wherein the narrow bands of visible light comprise at least one narrow band of light including at least one band from a group comprising yellow light and cyan light;
   an autofocus system configured to receive the second spectrum light from the at least one dichroic filter and determine a defocus amount of the optical lens system based on the at least one band from a group comprising yellow light and cyan light of the second spectrum light; and
   a main image sensor configured to receive the first spectrum light from the at least one dichroic filter and configured to output object image data corresponding to an image of the object.

17. The image device of claim 16, wherein the overlapping regions include light within at least one range from a group comprising light in a range substantially between 490 run and 510 nm and light in a range substantially between 575 ran and 595 sum.

18. A method for autofocusing an image device on an object, the image device including an optical lens system, an autofocus system an image sensor, the method comprising acts of:
   receiving, by the optical lens system, light from the object;
   separating the light into a first spectrum light and a second spectrum light, wherein the second spectrum light includes light not needed to determine output image data corresponding to an image of the object including at least one of infrared light and ultraviolet light;
   reflecting the second spectrum light to the autofocus system;
   reflecting the first spectrum light to the image sensor;
   detecting a focus state of the optical lens system by using the at least one of infrared light and ultraviolet light of the second spectrum light; and
   producing object image data corresponding to an image of the object by using the first spectrum light.

* * * * *